UNITED STATES PATENT OFFICE.

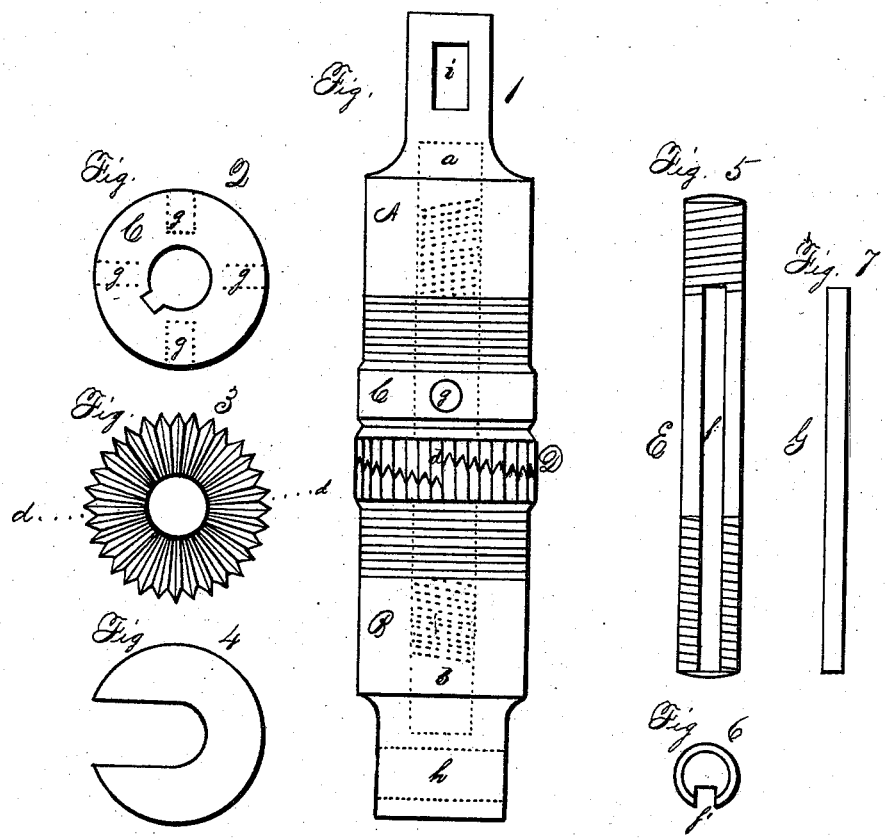

ELIHU L. PERKINS, OF GENEVA, OHIO.

CONNECTION FOR PRESSES, &c.

SPECIFICATION forming part of Letters Patent No. 231,929, dated September 7, 1880.

Application filed June 14, 1880. (No model.)

*To all whom it may concern:*

Be it known that I, ELIHU L. PERKINS, of the village of Geneva, county of Ashtabula, and State of Ohio, have invented an Improved Connection for Presses and other Machines requiring Adjustable Connections, of which the following is a specification.

The invention relates to adjustable connections for presses and other machines.

The object of my invention is to provide a simple and durable connection for presses and other machines, by means of which the connections which are required to be adjusted as to length for different kinds of work may be easily and conveniently adjusted, and remain firm, without liability to loosen and derange the action of the machines during long periods of severe work.

The invention consists in the use of a fluted or notched wedge, of which the most convenient form for presses and many other machines is the annular form described in the drawings accompanying this specification, having a rotary motion, which secures a firm, convenient, and accurate adjustment of the length of the connection.

In the accompanying drawings, in which similar letters of reference indicate like parts, Figure 1 is a sectional elevation, showing the principal parts of a connection embodying my invention. Fig. 2 is a plan view of a part used, as heretofore, for operating the adjusting-screw. Fig. 3 is a plan view of one of the fluted wedges, which are similar. Fig. 4 is a plan view of a block used, as heretofore, in the adjustment of the connection, said blocks being multiplied to any number which may be desired above and below the wedges, as shown in Fig. 1. Fig. 5 is a section of the adjusting-screw, also used as heretofore, to the operation of which Fig. 2 relates, Fig. 6 representing a section of the lower end of the same, and Fig. 7 a vertical sectional view of the spline for operating the same.

A is the upper extremity of the connection, which shows the parts necessary for attachment to the machines as heretofore used; *a*, the chamber for the adjusting-screw, and *i* the key-hole for attaching the connection to the press or other machine; B, the lower extremity of the connection; *b*, the lower chamber for the lower end of the adjusting-screw, the dotted oblique lines representing the threads of the interior screw for operating the adjustment by the right and left hand screw, in the same manner as heretofore, and *h* the hole for a pin which connects the above-described parts with the press or other machine and allows vibration of the connection, as usual.

Each of the fluted wedges D D, the fluted faces of which are inclined and extend between the opposite points, *d d*, in contact with each other, as shown in Fig. 1, are easily rotated by the hand when the adjusting-screw E is slackened, and placed in any position desired, the inclined surfaces causing the contraction of the length of the connection when the wedges are in the position shown in Fig. 1, and causing the expansion of the length of the connection when the wedges are rotated in such a manner as to separate the parts at the vertical line *d*, and when any adjustment of the wedges is made the fluted or notched form of the faces of the wedges secures a firm adjustment of all the parts of the connection, without any liability of the slipping of the wedges along the inclined faces of each.

The adjusting-screw E is operated by the collar C, turned in the usual manner by a rod inserted into the holes *g g*, the spline G being inclosed and held by the slots *f* and *f'*, as heretofore.

The parts shown in Figs. 2, 4, 5, 6, and 7 are not new, and I hereby disclaim the invention of them, their description herein and in the drawings being only for the purpose of showing the best manner of using the device or machine invented by me, herein described.

What I claim is—

1. The inclined surfaces in the annular wedges D D, substantially as described.

2. The fluted, notched, or corrugated surfaces of the wedges D D, substantially as described.

3. The combination of the two fluted, notched, or corrugated and inclined wedges D D, collar C, and screw E, constructed substantially as described.

ELIHU L. PERKINS.

Witnesses:
  ARTHUR W. LYMAN,
  MINNIE E. CARTER.